US00RE36213E

United States Patent [19]

Lautenschläger et al.

[11] E Patent Number: Re. 36,213

[45] Reissued Date of Patent: Jun. 1, 1999

[54] FURNITURE HINGE

[75] Inventors: Horst Lautenschläger, Reinheim; Gerhard Lautenschläger, Brensbach-Wersau, both of Germany

[73] Assignee: MEPLA-Werke Lautenschlager GmbH & Co. KG, Germany

[21] Appl. No.: 08/565,068

[22] Filed: Nov. 30, 1995

Related U.S. Patent Documents

Reissue of:

[64] Patent No.: 5,375,297
Issued: Dec. 27, 1994
Appl. No.: 08/056,034
Filed: Apr. 30, 1993

[51] Int. Cl.[6] ..... E05D 7/04

[52] U.S. Cl. ..... 16/249

[58] Field of Search ..... 16/249, 248

[56] References Cited

U.S. PATENT DOCUMENTS

| | | | |
|---|---|---|---|
| 806,677 | 12/1905 | Keil | 16/249 |
| 1,537,869 | 5/1925 | Murray | 16/265 |
| 4,045,841 | 9/1977 | Rock et al. | 16/249 |
| 4,091,522 | 5/1978 | Suermann et al. | 16/249 |
| 4,227,284 | 10/1980 | Zernig | 16/249 |
| 4,312,098 | 1/1982 | Sundermeier | 16/240 |
| 4,368,558 | 1/1983 | Grass | 16/332 |
| 4,506,409 | 3/1985 | Lautenschlager | 16/249 |
| 4,516,813 | 5/1985 | Sekerich | 16/364 |
| 4,716,622 | 1/1988 | De Bruyn | 16/335 |
| 4,803,749 | 2/1989 | Rock et al. | 16/382 |
| 5,175,908 | 1/1993 | Domenig | 16/237 |
| 5,327,616 | 7/1994 | Lautenschlager | 16/382 |

FOREIGN PATENT DOCUMENTS

| | | | |
|---|---|---|---|
| 0391486 | 10/1990 | European Pat. Off. | 16/249 |
| 1516974 | 3/1968 | France | 16/271 |
| 1554336 | 11/1969 | Germany | 16/249 |
| 3502468 | 7/1986 | Germany | 16/249 |
| 1193691 | 6/1970 | United Kingdom | 16/249 |

*Primary Examiner*—Chuck Y. Mah
*Assistant Examiner*—Donald M. Gurley
*Attorney, Agent, or Firm*—Londa and Traub LLP

[57] ABSTRACT

Furniture hinge for hanging a door on a cabinet carcase whose door-side front face is narrowed by a frame formed of stick-like frame members reaching inward at right angles from the side walls and at least partially overlapping the inside of the door in the closed position, the hinge having a hinge arm of sheet metal which has a fastening plate which can be placed on the free edge face of a member of the frame remote from the side wall, has a width substantially corresponding to the width of the edge face of the frame member, bears the actual arm section coupled by a linkage to the hinge part attached to the door, and is provided with a slot running in the longitudinal direction of the edge face of the frame member, the width of the slot being substantially equal to the diameter of the shaft of the fastening screw, and at least one tab being created on the back edge of the fastening plate pointing into the cabinet interior which is bent substantially at right angles against the cabinet-interior face of the frame member, and an opening for the entry of the fastening screw is provided in the fastening plate, leading into the longitudinal slot and permitting the introduction into the longitudinal slot of the shaft of the fastening screw pre-installed in the frame member as long as the head of the pre-installed fastening screw is at a distance from the edge face of the frame member that is at most equal to the height of the bent tabs.

7 Claims, 3 Drawing Sheets

FURNITURE HINGE

Matter enclosed in heavy brackets [ ] appears in the original patent but forms no part of this reissue specification; matter printed in italics indicates the additions made by reissue.

BACKGROUND OF THE INVENTION

The invention relates to a furniture hinge for hanging a door on a cabinet carcase whose door-front face is narrowed by a frame projecting at right angles from the side walls and formed by stick-like frame members, which is overlapped at least partially by the inner side of the door in the closed state, and bears a fastening plate placeable on the free edge of a frame member facing away from the side wall, which has a width corresponding substantially to the width of the edge of the frame member and bears the actual arm section coupled by a joint mechanism to the hinge member attached to the door and is provided with a longitudinal slot running in the lengthwise direction of the edge of the frame member, whose width is substantially equal to the diameter of the shaft of the mounting screw, while on the rearward margin of the fastening plate pointing into the cabinet interior at least one tab is fashioned, which is bent substantially at right angles against the cabinet-interior flat side of the frame member.

Hinges which are intended for such cabinets with an inwardly reaching frame are, as a rule, mounted at their carcase-related end by means of a fastening plate which can be screwed to the free edge, facing away from the side wall, of the inwardly reaching frame member, while the fastening plate, of a width approximately equal to the width of the edge of the frame member, can be part of a mounting plate on which the actual hinge supporting arm forming the carcase-related part of the hinge is adjustably fastened, or the fastening plate can also be an integral part of the hinge arm itself. To be able to adjust vertically the door hung on the cabinet carcase, the openings provided in the fastening plate for the fastening screws are as a rule configured as at least one longitudinal slot, so that, with the fastening screw loosened, a vertical displacement of the door within the given length of the longitudinal slot is possible. By tightening the fastening screw the fastening plate is then fixed in the new established vertical position of the door.

The exact fixation of the fastening plate with respect to the horizontal setting of the door on the cabinet carcase is as a rule assured by the fact that tabs bent at right angles are provided on the front margin of the fastening plate, which during installation are pushed into contact with the front side of the frame member and thus determine the position of the fastening plate and hence of the hinge arm in the horizontal direction with respect to the cabinet carcase. The hanging of doors on the carcase is performed, at least in large series production, by means of hinges preinstalled on the doors by bringing the doors with the hinge arm hanging downward in the open position against the carcase lying on its back so that the fastening plates of the hinge arm come into contact with the free face of the associated frame member, then driving the fastening screws through the longitudinal slots in the fastening plates into the frame member. For this purpose as a rule two persons are necessary, one of which holds the door and aligns it relative to the carcase, while the second person drives the fastening screw at least to the extent that the door is held in a preliminary manner on the carcase.

To enable the door to be installed by a single person, it has been proposed in the inventor's co-pending application Ser. No. 08/022,064, now U.S. Pat. No. 5,327,616, filed Feb. 24, 1993, to create on the front and rear margin of the fastening plate at least one tab bent substantially at right angles against the inside and outside faces of the frame member, the inner tab or tabs being provided with a projection that is sharp-pointed or knife-edged pointing toward the inside face of the frame member. For the preinstallation of the fastening plate to the frame member of the cabinet carcase, the procedure can be such that the fastening plate is placed on the frame member at such an angle that the tabs inside the cabinet will catch behind the surface on the interior flat side of the frame member, while the front frame members lie on the face of the frame member virtually in the marginal area. Then a pressure is exerted on the hinge arm through the door standing in the open position of the hinge and the door-related hinge part, which passes the front tabs over the front arris of the edge of the frame member and swings the fastening plate against the edge of the frame member. At the same time the sharp-pointed or sharpened projections on the cabinet-interior tabs dig into the inside face of the frame member, thereby obtaining a positive holding of the fastening plate on the frame member, even if no fastening screw has as yet been driven through the longitudinal slot into the frame member. I.e., in this embodiment the door can be pre-installed without the need for a second person to drive in the fastening screw. This driving of the screw does not take place until an additional procedure is performed, i.e., it can be done by the same person who pre-installed the door, or, in the case of production line work, in a subsequent work station. The pressing of the front tab of the fastening plate over the front arris of the edge of the frame member in pre-installation does not, however, make it impossible for the front arris to be damaged. As long as the hinge does not have to be adjusted up or down such damage does no harm because the front tabs cover the damaged parts of the arris. In the event of adjustment of the height of the door, however, the damaged areas can become visible, and this is undesirable.

Like the hinge described above the invention is addressed to the problem of permitting the pre-installation of the door on the frame member of the cabinet carcass by a single person without the danger that the door might drop and possibly damaging the frame member, especially in the area of the front face of the frame member which is visible when the door is open, while the vertical adjustment of the fastening plate on the cabinet is to be still possible when the fastening screw is loosened and with it the door.

SUMMARY OF THE INVENTION

Setting out from a cabinet hinge of the kind mentioned above, this problem is solved in accordance with the invention in that an entry opening leading into the longitudinal slot is provided in the fastening plate for the fastening screw, permitting the introduction into the longitudinal slot of the shaft of the fastening screw, *when the fastening screw is* pre-mounted in the frame member as long as the head of the pre-mounted fastening screw is at a distance from the edge of the frame member that is equal to or greater than the height of the bent tab.

In a preferred embodiment of the invention, the entry opening is in the form of a slot running at right angles to the longitudinal slot, whose width, at least at the mouth of its entry into the longitudinal slot, is about equal to the diameter of the shaft of the fastening screw.

At its mouth remote from the longitudinal slot, in the edge of the fastening plate, the slot can widen, so as to simplify introduction of the shaft of the fastening screw into the longitudinal slot when mounting the door bearing the hinge pre-installed thereon.

Alternatively, the entry opening can be at least a pass-through opening adjacent the longitudinal slot, through which the head of the fastening screw can pass, and which is in communication with the longitudinal slot, the width of the junction with the slot being approximately equal to the diameter of the shaft of the fastening screw. When the hinge is pre-installed on the cabinet carcase, the head of the pre-installed fastening screw must thus be put through the pass-through opening, which requires that the pass-through opening have a corresponding size, i.e., a diameter that is at least slightly larger than the diameter of the head of the fastening screw.

The configuration can be made such that an essentially circularly defined pass-through opening for the head of the fastening screw is provided in the area between the longitudinal slot and the carcase-internal rear edge of the fastening plate, the pass-through opening and the longitudinal slot being joined together by a slot whose width is equal to the diameter of the shaft of the fastening screw. Since the fastening screw is pre-installed, presumably, on the frame member so that the distance between the edge surface of the frame member and the underside of the screw head is at least equal and preferably slightly greater than the height of the tap or tabs, the fastening plate can be brought to the fastening screw and its head introduced through the pass-through opening, and then the fastening plate is shifted such that the shaft of the fastening screw passes through the slot into the range of the longitudinal slot. The longitudinal slot and the tab or tabs are spaced apart horizontally such that the shaft of the fastening screw comes in contact with the carcase-external edge of the longitudinal slot when the tab or tabs on the back edge of the fastening plate can be guided over the inner arris of the frame member to the inner flat side of the frame member. A slight turning of the fastening screw then secures the fastening plate to the frame member unlosably, although it is still vertically adjustable on the frame member in the direction of the longitudinal slot.

In an additional embodiment of the invention, the configuration can be made such that two pass-through openings are provided for the head of the fastening screw, one at each of the opposite ends of the longitudinal slot. It is then recommendable to provide a projection protruding in the direction of the head of the fastening screw at the transition from each pass-through opening into the longitudinal slot, its height being lower than the height of the bent tab. These projections provide the assurance that after its head has passed into the reach of the longitudinal slot the fastening screw, after a slight turn inward, can no longer be shifted back into the pass-through opening, because then the head of the fastening screw will abut against the projection.

In order to be sure of this blockage against the shifting of the shaft of the fastening screw into the pass-through openings, it is recommendable to provide a projection at the transition of the two parallel edges of the slot into the pass-through openings, so that two projections will always act as abutments if the fastening plate accidentally shifts toward one of the pass-through openings.

BRIEF DESCRIPTION OF THE DRAWINGS

The invention is further explained in the following description of several embodiments, in conjunction with the drawing, wherein.

DETAILED DESCRIPTION OF THE INVENTION

Figure 1:
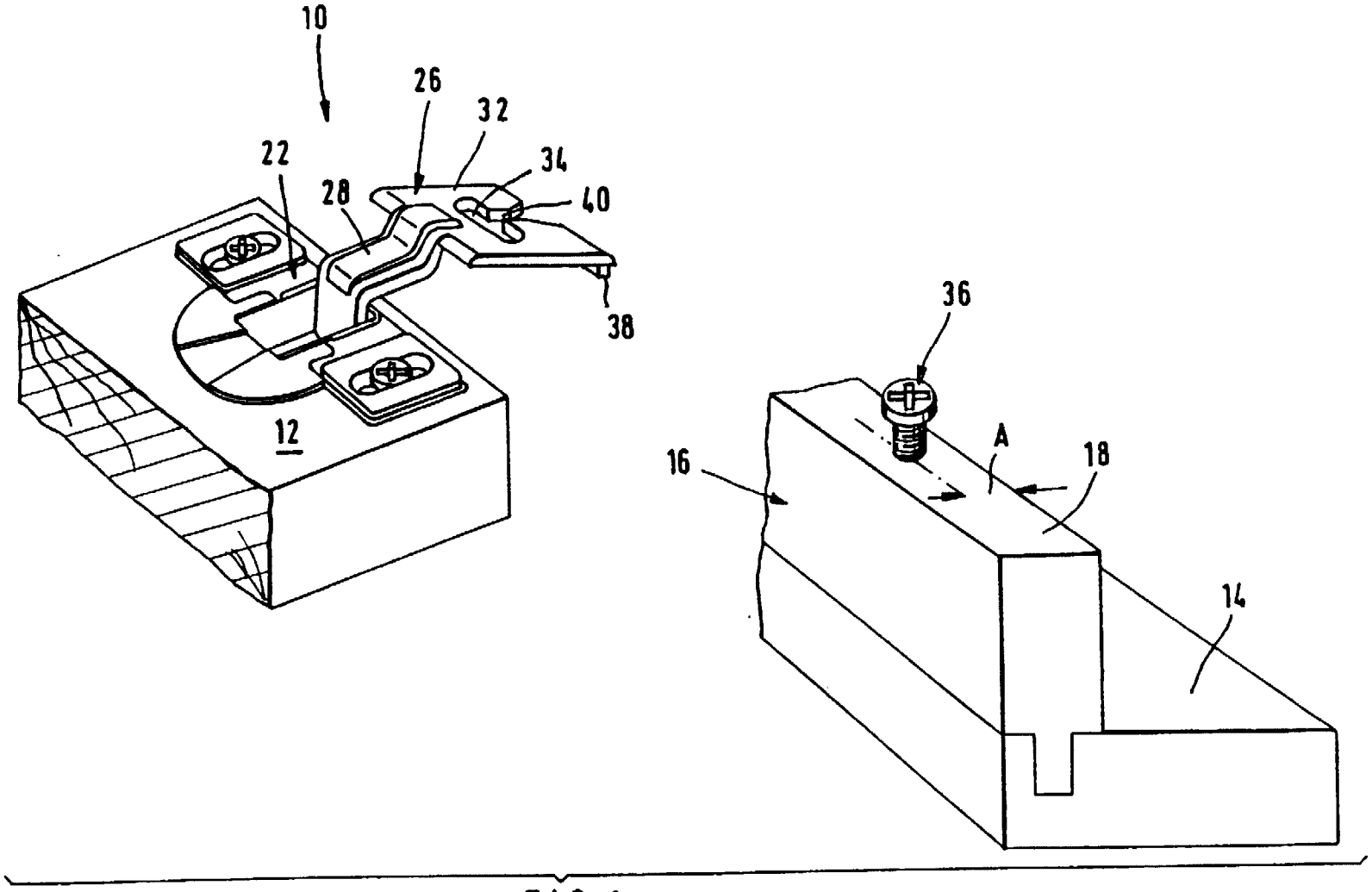
FIG. 1 is a perspective view of a first embodiment of the hinge according to the invention, before the fastening plate is held under a fastening screw pre-installed on the frame member.

The hinge shown in FIG. 1 and identified as a whole by 10 serves for hanging a door 12 on a cabinet carcase whose front that is to be closed by the door 12 is narrowed by an inwardly reaching frame formed of stick-like frame members. In FIG. 1, only a second of a side wall 14 of the carcase is shown, as well as a section, fastened to the side wall 14, of a stick-like frame member 16 on whose edge surface 18 facing away from the side wall the hinge is to be fastened to the carcase.

The hinge 10, which in the case represented is a single-link hinge, has a door-related member 22 in the form of a cup to be set in a mortise 20 (FIGS. 2a to 2c) in the back of the door 12, and a carcase-related member 26 pivoting about a hinge pin 24 provided inside of the cup.

Figure 3A:
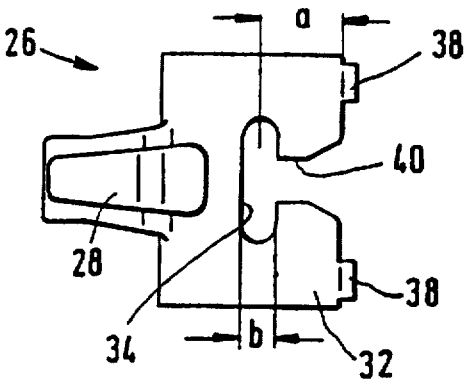
Figure 3B:
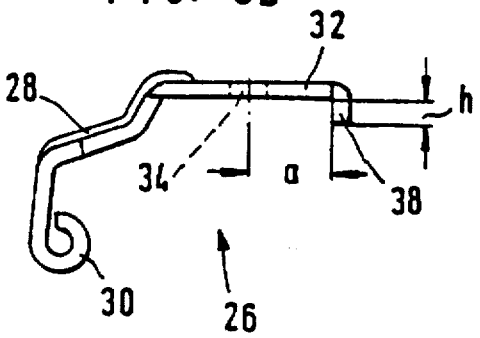

The carcase-related hinge member 26, made in a known manner by stamping and drawing from metal, has a hinge arm 28 on whose end inside of the cup 22 a pivot eye 30 FIG. 3b) is rolled around the hinge pin 24. At the other, carcase end of the hinge arm 28 is a substantially flat fastening plate 32 integral therewith, whose width corresponds approximately to the width of the edge surface 18 of the frame member 16, and which has a fastening opening in the form of an elongated slot 34 running parallel to the hinge pivot axis formed by the longitudinal central axis of the hinge pin 24, through which, in the intended fastening position, the shaft of a fastening screw 36 passes which is driven into the edge face 18 of the frame member 14.

On the back edge of the fastening plate 32 two tabs 38 are created, which are spaced apart lengthwise of the frame member 16 and bent substantially at right angles against the inside face of the frame member 16. The distance "a" between the longitudinal central axis of the longitudinal slot and the surface of the tabs 38 which will be in contact with the inside face of frame member 16 when in the intended mounting position corresponds substantially to the distance "A" between the longitudinal central axis of the fastening screw 36 *when the fastening screw is* pre-installed in the edge face 18, and the inside face of the frame member, so that, assuming that the width "b" of the longitudinal slot is substantially equal to the diameter of the shaft of the fastening screw 36, a fastening plate 32 held by the fastening screw 36 on the edge face 18, and hence also a door 12 hung by hinges 10 on the cabinet carcase, will be held against movement horizontally both toward and away from the carcase interior, even if the fastening screw 36 has not yet been fully tightened. The withdrawal of the hinge from the carcase interior is prevented by the bent tabs 38 engaging the cabinet-interior face of the frame member 16, while the outer edge of the longitudinal slot 34 abuts against the shaft of the fastening screw 36, so that therefore even movement toward the carcase interior is prevented. Only a shift of the fastening plate and thus of the door 12 in the lengthwise direction of the longitudinal slot 34 is initially possible, i.e., while the fastening screw 36 has not been fully tightened. By tightening the fastening screw 36 so that the fastening plate 32 is held clamped between the face 18 and the head of the fastening screw 36, the hinge is then fixed also in the vertical direction on the cabinet carcase.

To be able to install the hinge 10 on the cabinet carcase while it is pre-installed on the door 12, in the fastening screw 36 which is at first only partially driven, an entry opening is provided in the form of a slot 40 leading approximately centrally through the cabinet-interior boundary edge of the elongated slot 34, and its width is approximately equal to or slightly greater than the width "b" of the elongated slot, and it expands toward the back boundary edge of the fastening plate 32 in order to facilitate the entry of the shaft of the fastening screw 36 when the fastening plate is slipped into the gap formed between the end face 18 and the bottom of the head of the fastening screw.

As soon as the fastening plate 32 is then pushed over the fastening screw 36 until the outer boundary edge of the slot 34 comes in contact with the shaft of the fastening screw, two or three turns of the fastening screw in the driving direction will suffice to bring the fastening plate with the screw head onto the end face 18, and then the bent tabs 38 pass behind the carcase-interior, i.e., rear edge, of the frame member and thus secure the fastening plate 10 and thus the hinge 10 and a door 12 pre-mounted with hinges 10 on the cabinet carcase against withdrawal from the cabinet carcase.

It is important to remember that before the fastening plate 32 is set, the fastening screw 36 may be driven only so far into the edge face 18 that the bottom of its head is still at a distance from the edge face that is approximately equal to greater than the height "h" of the bent tabs 38 from the bottom of the fastening plate confronting the edge face to the free end of these tabs. Only then is it possible to push the fastening plate in the described manner under the head of the fastening screw 36.

Figure 2A:
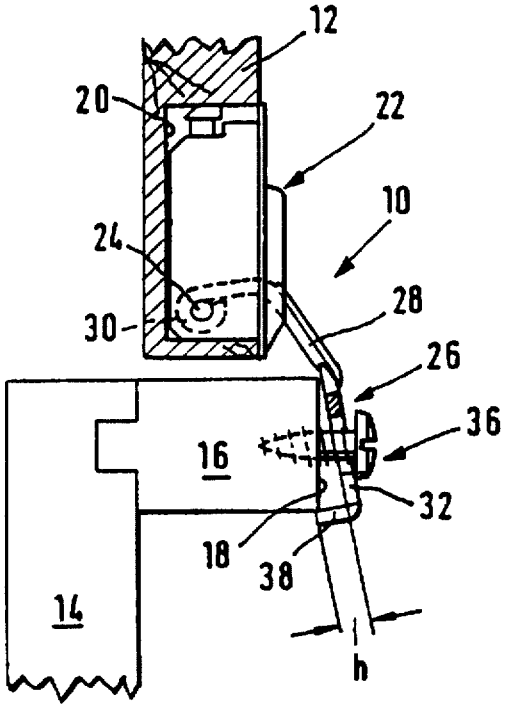
FIGS. 2a to 2c show various steps in the pre-installation of the hinge shown in FIG. 1, FIGS. 3a and 3b are a top and side view, respectively, of only the carcase-related member of the hinge shown in FIGS. 1 and 2a to 2c, FIGS. 4a and 4b are a top and side view, respectively, of a modified embodiment of the carcase-related hinge member.
Figure 2B:
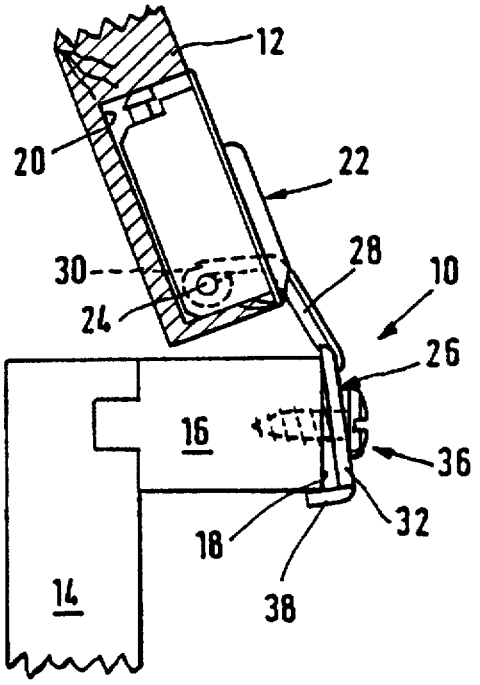
Figure 2C:
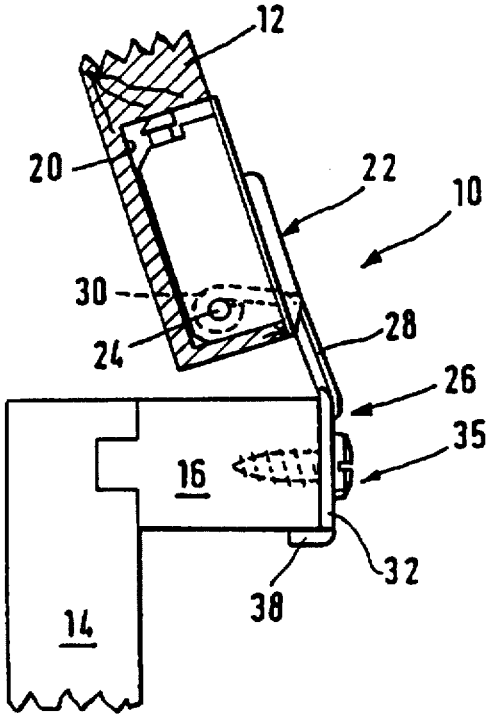

In FIGS. 2a to 2c there is shown how a door 12 provided with the pre-installed hinge 10 is hung on a cabinet carcase by a single person. Let it be assumed that the cabinet carcase is lying on its back and the doors together with the hinge arm 30 of the hinge, shown in the open position, are brought hanging from a hoist to the upwardly facing open front of the cabinet carcase. The fastening plate attached to the hinge arm 28 is then guided, with the slot 40 approximately in line with the shaft of the [prein-stalled] *pre-installed* fastening screw 36, underneath the head of the fastening screw, until the fastening plate 32 reaches the position represented in FIG. 2a. If the fastening screw 36 is then first screwed partially to the position represented in FIG. 2b, the bent tabs 38 reach over the carcase-interior face of the frame member 16 and it is no longer possible to pull the pre-mounted door 12 back. On the other hand, the fastening plate 32 can still be shifted lengthwise of the slot 34 in order to align the door 12 precisely with the carcase in the vertical direction. When this adjustment has been made, the fastening screw 36 is tightened and then presses the fastening plate 32 in the manner represented in FIG. 2c tightly against the end face 18 of the frame member 16, and then any shifting in the direction of the longitudinal slot 34 is no longer possible.

Figure 4A:
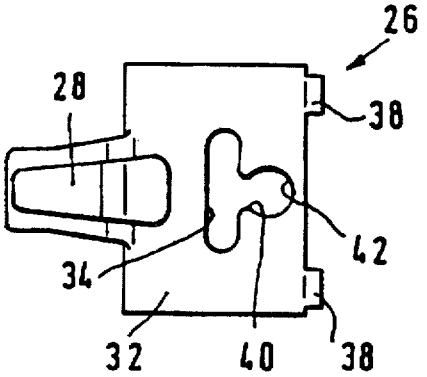
Figure 4B:
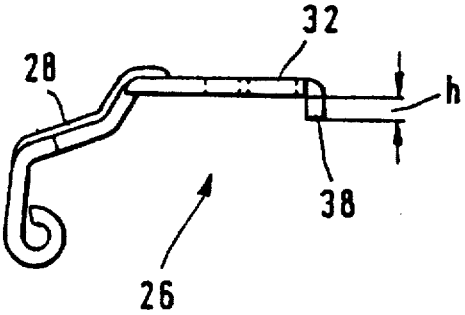

In FIGS. 4a and 4b there is shown the fastening plate 32 and a portion of the hinge arm 28 of an embodiment of the hinge 10 according to the invention that differs only in regard to the entry opening for the fastening screw 36. This entry opening is here not a flaring slot running all the way through to the back edge of the fastening plate 32, but instead the slot 40 leads into a pass-through opening 42 whose diameter is slightly greater than the diameter of the head of the fastening screw 36.

In the installation of the hinge provided with the fastening plate thus modified, the fastening plate is then not pushed with its carcase-interior edge under the head of the previously installed fastening screw 36, but is guided over the head of the fastening screw and then pushed in the direction of the edge face 18 of the frame member 16, so that the head of the fastening screw passes through the opening 42. Then the shaft of the fastening screw can again be pushed through the slot 40 into the longitudinal slot 34, and the installation is otherwise completed as in the case of the previously described embodiment. The width of the slot 40 should be approximately equal to or slightly greater than the diameter of the shaft of the screw.

Figure 5A:
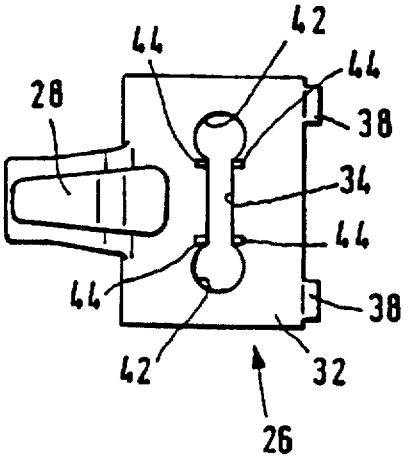
FIGS. 5a and 5b are a top and side view, respectively, of a third modified embodiment of the carcase-related hinge member.
Figure 5B:
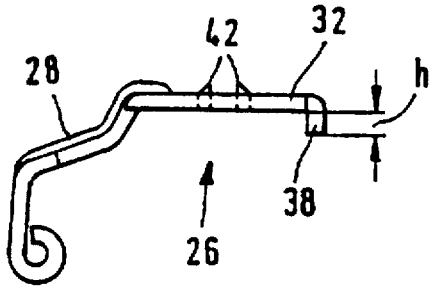

Lastly, FIGS. 5a and 5b show an additional modification of the fastening plate 32 for a hinge 10 in accordance with the invention. Instead of a pass-through opening 42 the fastening plate is now provided with two pass-through openings 42 disposed at the ends of the longitudinal slot 34, and in the transition between the pass-through openings 42 and the longitudinal slot 34 projections 44 protrude toward the head of the fastening screw 36 on both sides, their height being less than the height "h" of the bent tabs 38. Thus it is possible to tighten the fastening screw 36 after its shaft has been passed through one of the pass-through openings 42 and shifted in the longitudinal slot 34, so that the remaining distance between the underside of its fastening head and the edge face 18 of the frame member 16 is less than the height measured from the bottom of the fastening plate confronting the edge faces to the free ends of the projections 44. The fastening plate can then be shifted in the direction of its longitudinal slot on the shaft of the fastening screw, but the latter can no longer enter into the pass-through openings 42, since first the head of the fastening screw 36 will come in contact with the projections 44 and prevents such movement.

What is claimed is:

1. Furniture hinge for hanging a door on a cabinet carcase whose door-side front face is narrowed by a frame formed of stick-like frame members reaching inward at right angles from the side walls and at least partially overlapping the inside of the door in the closed position, the hinge comprising a hinge arm of sheet metal which has a fastening plate *consisting of a single piece* for placement on a free edge face of a member of the frame remote from the side wall, *the fastening plate having a bottom face being substantially within a single plane*, the fastening plate having a width substantially corresponding to the width of the edge face of the frame member, and bearing an arm section of the hinge arm, which arm section is coupled by a linkage to a hinge part formed for attachment to the door, the fastening plate being provided with a slot running in the longitudinal direction of the edge face of the frame member, the width of the slot being substantially equal to the diameter of a shaft of a fastening screw, and at least one tab being created on a bottom edge of the fastening plate oriented perpendicular to the plane of the fastening plate such that said tab points into the cabinet interior when the fastening plate is installed on the edge face, and such that said tab lies against the cabinet-interior face of the frame member, and an opening for the entry of the fastening screw is provided in the fastening plate, leading into the longitudinal slot and permitting the introduction into the longitudinal slot of the shaft of the fastening screw pre-installed in the frame member when the head of the pre-installed fastening screw is at a distance from the edge face of the frame member that is equal to or greater than the height of the bent tabs, the entry opening being a slot running at right angles to the longitudinal slot all the way to the bottom edge of the fastening plate, the width of the entry opening at least at the point of entry into the longitudinal slot being approximately equal to or slightly greater than the diameter of the shaft of the fastening screw.

2. Furniture hinge according to claim 1, in which the entry slot flares at its mouth remote from the longitudinal slot in [the] *a* margin of the fastening plate.

3. Furniture hinge for hanging a door on a cabinet carcase whose door-side front face is narrowed by a frame formed of stick-like frame members reaching inward at right angles from the side walls and at least partially overlapping the inside of the door in the closed position, the hinge comprising a hinge arm of sheet metal which has a fastening plate *consisting of a single piece* for placement on a free edge face of a member of the frame remote from the side wall, *the fastening plate having a bottom face being substantially within a single plane,* the fastening plate having a width substantially corresponding to the width of the edge face of the frame member, and bearing an [actual] arm section of the hinge arm *at one edge of the fastening plate*, which arm section is coupled by a linkage to a hinge part formed for attachment to the door, the fastening plate being provided with a slot running in [the] *a* longitudinal direction *perpendicular to the width* of [the edge face of the frame member] *the fastening plate*, the width of the slot being substantially equal to the diameter of a shaft of a fastening screw, and at least one tab being created on a bottom edge of the fastening plate *opposite said one edge and* oriented perpendicular to the plane of *the bottom face of* the fastening plate such that said tab points into the cabinet interior when the fastening plate is installed on the edge face, and such that said tab lies against the cabinet-interior face of the frame member, in which an entry opening is [at least] a substantially circularly defined pass-through opening adjacent to the longitudinal slot for the head of the fastening screw, the entry opening made at least slightly larger in its clear cross section than the head of the fastening screw, which opening is in communication with the longitudinal slot, the width of the area of communication to the longitudinal slot defining a connection slot and being approximately equal to or slightly greater than the diameter of the shaft of the fastening screw, wherein [a] the pass-through opening for the head of the fastening screw [as] *is* provided in the area between the longitudinal slot and the [carcase-internal bottom margin] *opposite edge* of the fastening plate, the connection slot being oriented to provide for movement of the fastening plate relative to the shaft in a direction generaly perpendicular to that of the longitudinal slot.

4. Furniture hinge for hanging a door on a cabinet carcase whose door-side front face is narrowed by a frame formed by stick-like frame members reaching inward at right angles from the side walls and at least partially overlapping the inside of the door in the closed position, the hinge comprising a hinge arm of sheet metal which has a fastening plate for placement on a free edge face of a member of the frame remote from the side wall, the fastening plate having a width substantially corresponding to the width of the edge face of the frame member, and bearing an [actual] arm section of the hinge arm, which arm section is coupled by a linkage to a hinge part formed for attachment to the door, the fastening plate being provided with a slot running in the longitudinal direction of the edge face of the frame member, the width of the slot being substantially equal to the diameter of a shaft of a fastening screw, and at least one tab being created on a bottom edge of the fastening plate oriented perpendicular to the plane of the fastening plate such that said tab points into the cabinet interior when the fastening plate is installed on the edge face, and such that said tab lies against the cabinet-interior face of the frame member, which two substantially circularly defined pass-through entry openings for the head of the fastening screw are provided, one at each of the opposite ends of the longitudinal slot, the entry openings made at least slightly larger in their clear cross section than the head of the fastening screw, which openings are in communication with the longitudinal slot, the width of the area of communication to the longitudinal slot being approximately equal to or slightly greater than the diameter of the shaft of the fastening screw, and wherein at [leas] *least* one projection protruding toward the head of the fastening screw is provided in the transition from each pass-through entry opening into the longitudinal slot, the height of the projection being less than the height of the tabs.

5. Furniture hinge according to claim 4, in which a projection is provided in the transition of each of two parallel edges of the longitudinal slot into the pass-through openings.

*6. Furniture hinge for hanging a door on a cabinet carcase whose door-side front face is narrowed by a frame formed of stick-like frame members reaching inward at right angles from the side walls and at least partially overlapping the inside of the door in the closed position,*

*the hinge comprising a hinge arm of sheet metal which has a fastening plate consisting of a single piece for placement on a free edge face of a member of the frame remote from the side wall, the fastening plate having a bottom face being substantially within a single plane, the fastening plate having a width substantially corresponding to the width of the edge face of the frame member, and bearing an arm section of the hinge arm, which arm section is coupled by a linking to a hinge part formed for attachment to the door,*

*the fastening plate being provided with a slot running in the longitudinal direction of the edge face of the frame member, the width of the slot being substantially equal to the diameter of a shaft of the fastening screw, and*

*at least one tab being created on a bottom edge of the fastening plate oriented perpendicular to the plane of the fastening plate such that said tab points into the cabinet interior and such that said tab lies against the cabinet-interior face of the frame member when the fastening plate is installed on the edge face, and*

*an opening for the entry of the fastening screw is provided in the fastening plate, leading into the longitudinal slot,*

*and when the fastening screw is pre-installed in the edge face of the frame member at a distance from the edge face that is equal to or greater than the height of the bent tabs, permitting the introduction of the shaft of the fastening screw into the longitudinal slot,*

*the entry opening being a slot running at right angles to the longitudinal slot all the way to the bottom side of the fastening plate, the width of the entry opening at least at the point of entry into the longitudinal slot being approximately equal to or slightly greater than the diameter of the shaft of the fastening screw.*

*7. Furniture hinge according to claim 6, in which the entry slot flares at its mouth remote from the longitudinal slot in a margin of the fastening plate.*

* * * * *